United States Patent
Donovan et al.

(10) Patent No.: US 9,826,841 B2
(45) Date of Patent: Nov. 28, 2017

(54) CHAIR BACK WITH ADJUSTABLE LUMBAR SUPPORT

(71) Applicant: L&P PROPERTY MANAGEMENT COMPANY, South Gate, CA (US)

(72) Inventors: Robert Dean Donovan, Mooreville, MS (US); Nikki Olen White, Pontotoc, MS (US)

(73) Assignee: L&P Property Management Company, South Gate, CA (US)

( * ) Notice: Subject to any disclaimer, the term of this patent is extended or adjusted under 35 U.S.C. 154(b) by 140 days.

(21) Appl. No.: 14/757,881

(22) Filed: Dec. 24, 2015

(65) Prior Publication Data
US 2017/0181549 A1 Jun. 29, 2017

(51) Int. Cl.
*A47C 7/46* (2006.01)
*B60N 2/66* (2006.01)

(52) U.S. Cl.
CPC .................... *A47C 7/462* (2013.01)

(58) Field of Classification Search
CPC .............. A47C 7/46; A47C 7/462; B60N 2/66
USPC ....................................................... 297/284.4
See application file for complete search history.

(56) References Cited

U.S. PATENT DOCUMENTS

| | | | | |
|---|---|---|---|---|
| 1,922,418 A | * | 8/1933 | Conant | A47C 7/425 248/407 |
| 3,807,794 A | * | 4/1974 | Beyer | A47C 7/462 297/284.4 |
| 4,183,533 A | | 1/1980 | Kulesza et al. | |
| 4,313,637 A | * | 2/1982 | Barley | A47C 7/462 297/284.4 |
| 4,830,429 A | * | 5/1989 | Petitjean | A47C 1/031 297/284.4 |
| 6,402,246 B1 | | 6/2002 | Mundell | |
| 7,578,797 B2 | * | 8/2009 | Hazard | A47C 3/0255 297/273 |
| 8,622,468 B2 | * | 1/2014 | Masuda | B60N 2/66 297/113 |
| 2003/0085600 A1 | | 5/2003 | Mori | |
| 2003/0178882 A1 | | 9/2003 | Schmitz et al. | |

(Continued)

FOREIGN PATENT DOCUMENTS

CA 1125159 A 6/1982
EP 2039270 A1 3/2009

OTHER PUBLICATIONS

Extended European Search Report dated Apr. 4, 2017 in European Patent Application No. 16205016.5, 7 pages.

(Continued)

*Primary Examiner* — Robert Canfield
(74) *Attorney, Agent, or Firm* — Shook, Hardy & Bacon L.L.P.

(57) ABSTRACT

An adjustable lumbar support mechanism for adjusting a position of a lumbar support in a seating unit is provided. The mechanism includes a pair of spaced apart swing links that are pivotally coupled on an upper end to the back frame of the seating unit. The lower free end of each swing link is coupled to a lumbar support. An actuating mechanism is coupled on an upper end to the back frame, and on a lower end is pivotally coupled to the lumbar support. Extending the shaft of the actuating mechanism extends the lumbar support providing additional support to someone sitting in the seating unit.

16 Claims, 5 Drawing Sheets

(56) References Cited

U.S. PATENT DOCUMENTS

| | | | |
|---|---|---|---|
| 2003/0184139 A1 | 10/2003 | Sloan, Jr. | |
| 2007/0106188 A1* | 5/2007 | Walker .................. | B60N 2/666 602/19 |
| 2009/0079245 A1* | 3/2009 | Marcantoni ............ | A47C 7/465 297/284.4 |
| 2009/0218863 A1 | 9/2009 | Lapointe et al. | |
| 2013/0145553 A1* | 6/2013 | Shih ....................... | A47C 7/462 5/624 |
| 2016/0367033 A1* | 12/2016 | Sigmon .................. | A47C 1/02 |

OTHER PUBLICATIONS

International Search Report and Written Opinion dated Apr. 6, 2017 in International Patent Application No. PCT/US2017/014146, 8 pages.

Non-Final Office Action dated Jun. 9, 2017 in U.S. Appl. No. 15/012,949, 8 pages.

* cited by examiner

CHAIR BACK WITH ADJUSTABLE LUMBAR SUPPORT

BACKGROUND

The invention relates to a residential seating unit. More particularly, the invention relates to a residential seating unit that has an adjustable lumbar support mechanism for providing enhanced adjustable lumbar support.

The present invention relates broadly to upholstery furniture designed to support a user's body in an essentially seated disposition. The invention can also be used on motion upholstery furniture including recliners, incliners, sofas, love seats, sectionals, theater seating, and traditional chairs, such furniture pieces being referred to herein generally as "seating units." More particularly, the present invention relates to an improved seating unit with an adjustable lumbar support mechanism disposed within the back of the seating unit.

Conventionally, the residential seating units have either no lumbar support, a fixed lumbar support, or a complicated adjustable lumbar support. What is needed is an economical, simple, adjustable lumbar support for reclining seating units.

BRIEF SUMMARY

At a high level, this invention is directed to an adjustable lumbar support mechanism for adjusting a position of a lumbar support in a seating unit. The mechanism includes a pair of spaced apart swing links that are pivotally coupled on an upper end to the back frame of the seating unit. The lower free end of each swing link is coupled to a lumbar support. An actuating mechanism is coupled on an upper end to the back frame, and on a lower end is pivotally coupled to the lumbar support. Extending the shaft of the actuating mechanism extends the lumbar support providing additional support to someone sitting in the seating unit.

Embodiments of the invention are defined by the claims below, not this summary. A high-level overview of various aspects of the invention is provided here to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

BRIEF DESCRIPTION OF THE SEVERAL VIEWS OF THE DRAWINGS

The accompanying drawings form a part of the specification, are to be read in conjunction therewith, and are incorporated by reference in their entirety. In the drawings.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Throughout this disclosure various components are described that are pivotally interconnected. The pivotal couplings (illustrated as pivot points in the figures) between these linkages can take a variety of configurations, such as pivot pins, bearings, traditional mounting hardware, rivets, bolt and nut combinations, or any other suitable fasteners which are well known in the furniture-manufacturing industry. Also, the shapes of the links and the brackets may vary as desired, as may the locations of certain pivot points, unless otherwise indicated.

Figure 1:
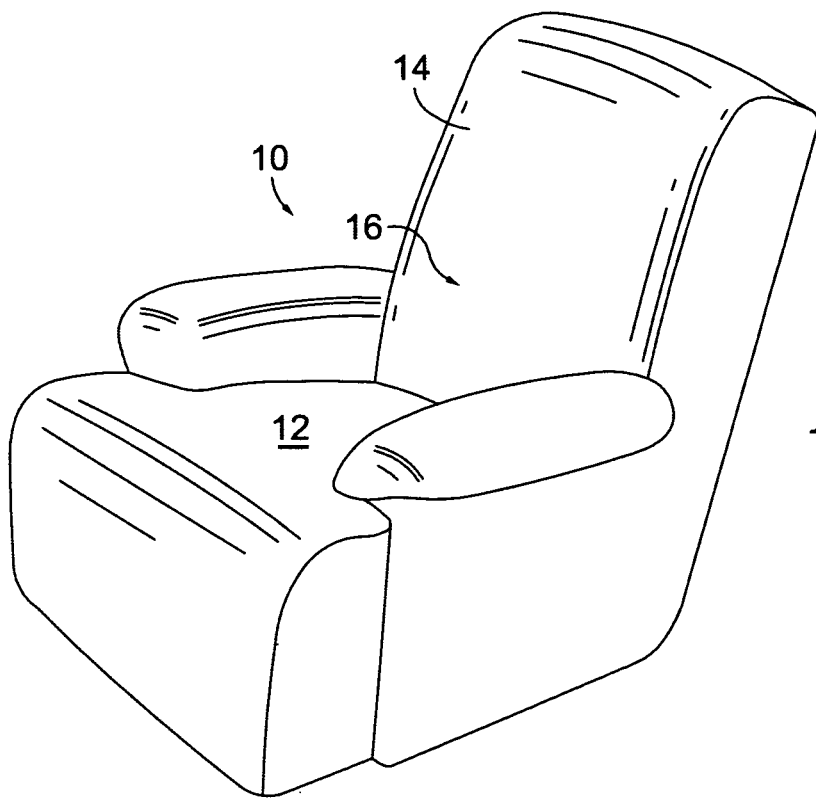
FIG. 1 is a front perspective view of a seating unit in a position with an adjustable lumbar support in a retracted position in accordance with an embodiment of the present invention.
Figure 2:
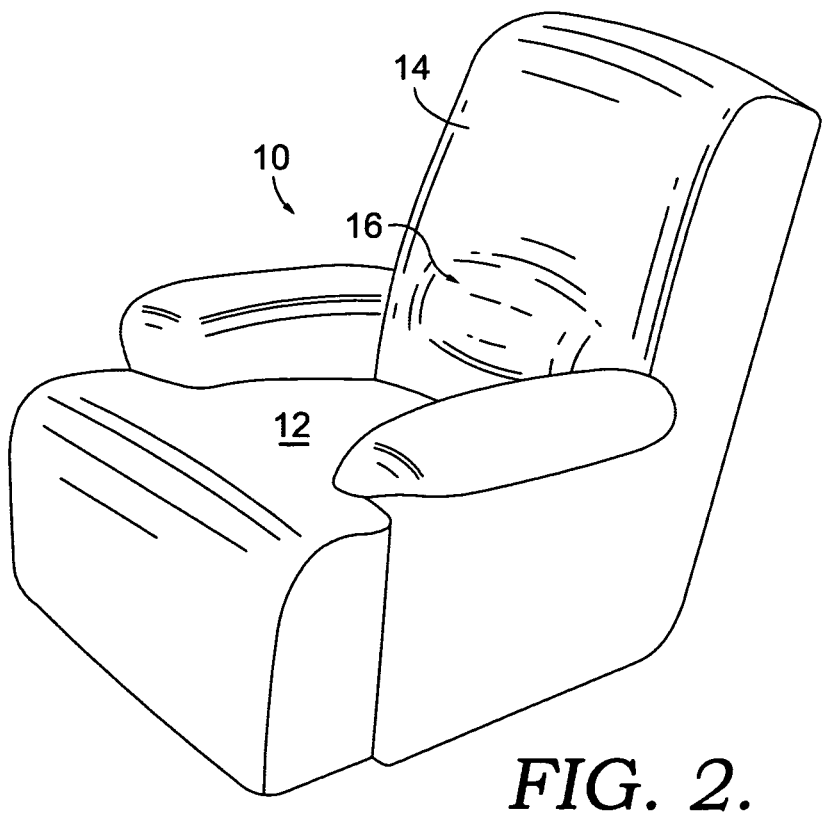
FIG. 2 is a view similar to FIG. 1, in a position with an adjustable lumbar support in an extended position in accordance with an embodiment of the present invention.
Figure 4:
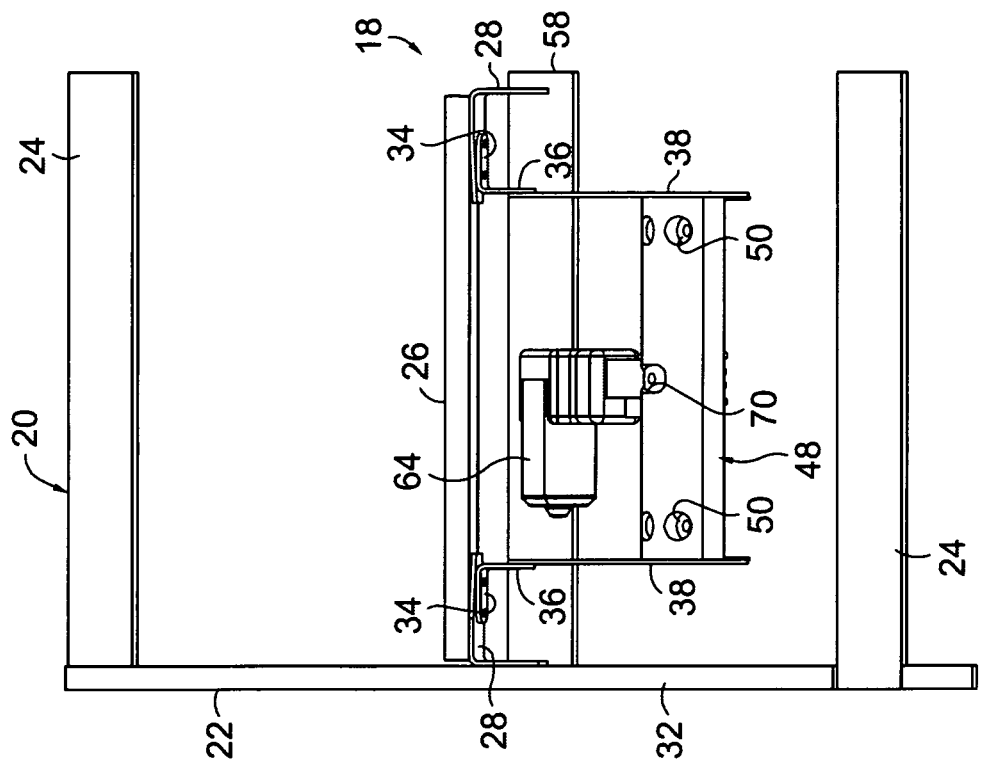
FIG. 4 is a front view, of the adjustable lumbar support mechanism depicted in FIG. 3, in accordance with an embodiment of the present invention.
Figure 3:
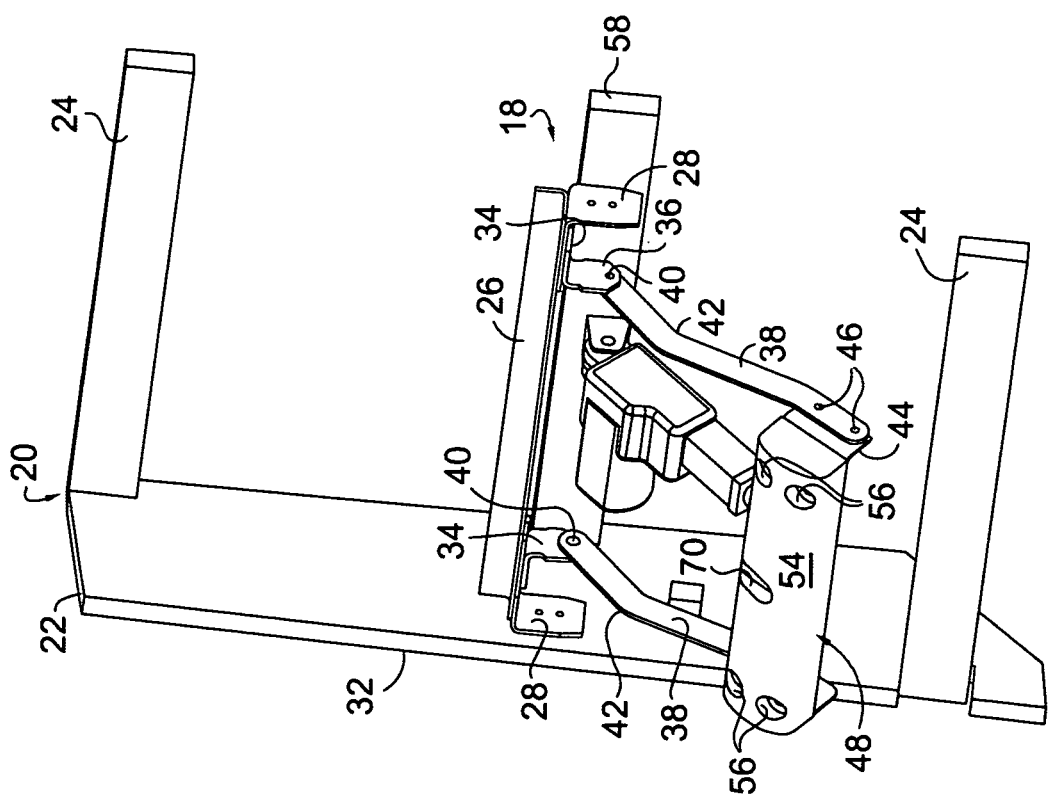
FIG. 3 is a front perspective view of the adjustable lumbar support mechanism in an extended position and showing portions of the chair back frame in accordance with an embodiment of the present invention.

An exemplary seating unit 10 is shown in FIGS. 1 and 2. Seating unit 10 has a seat 12 and a back 14. Near the seat 12 in the lower area of back 14 is a lumbar area 16. Back 14 is shown in FIGS. 3-8 without the finishing foam, fabric, etc., to reveal details of construction of an underlying adjustable lumbar support mechanism 18. Lumbar support mechanism 18 could be placed in a variety of seating units, as known to those of skill in the art. As shown, an exemplary back frame 20 includes spaced apart back posts 22 supported by cross members 24 (only one back post 22 is shown, with the other removed to show the adjustable lumbar support mechanism 18). The back frame 20 as shown is merely exemplary and it should be understood that the back frame 20 could take on any of a number of different constructions.

Figure 8:
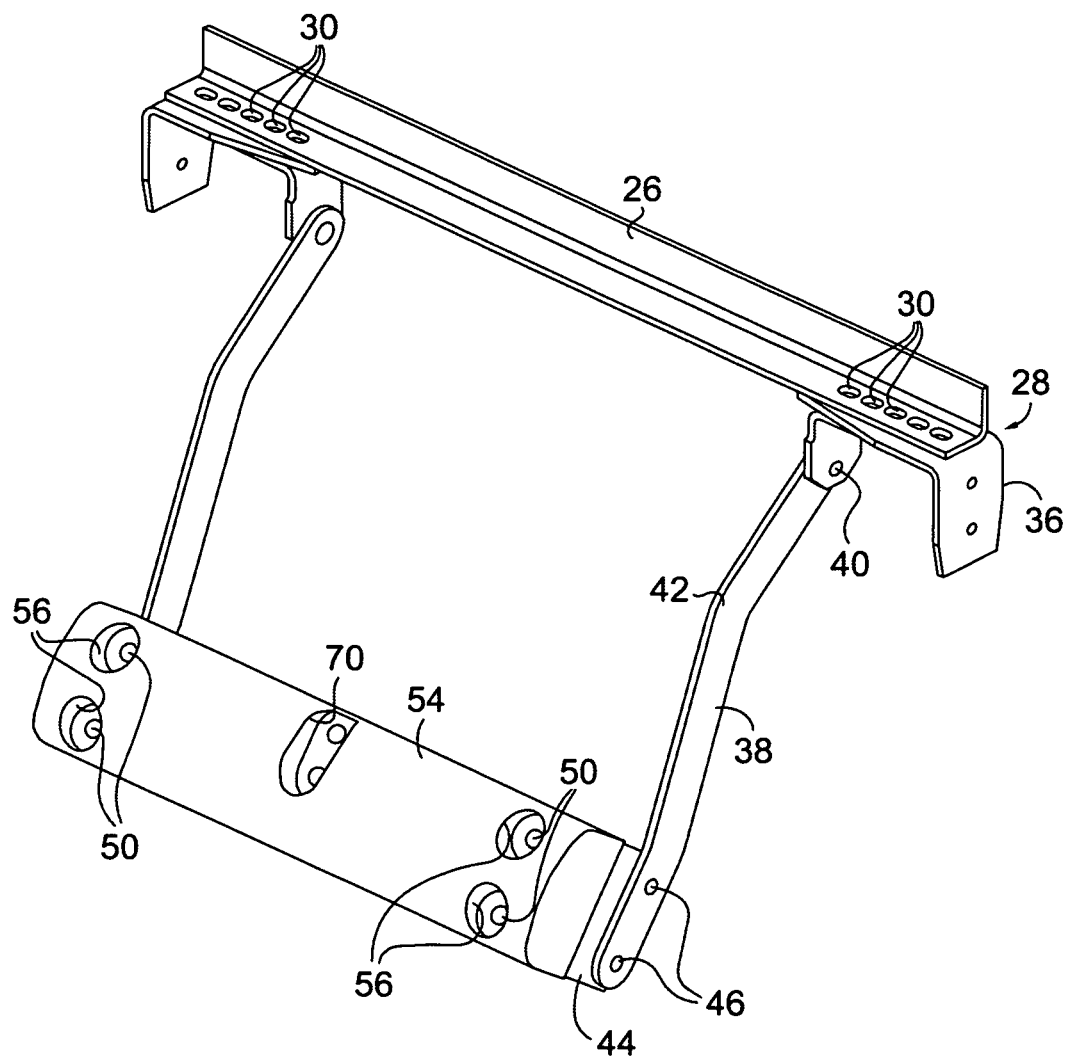
FIG. 8 is a partial, front perspective view of the mechanism, showing more of a top view of some components.

Lumbar support mechanism 18 includes a cross member 26 mounted to, and between, back posts 22 by a pair of cross member brackets 28. As best seen in FIG. 8, in an exemplary embodiment, cross member 26 may be formed from an angled metal, and may have a series of spaced mounting holes 30. Cross member 26 could also be formed from a wood rail. The mounting holes 30 are used to couple the cross member brackets 28 to the cross member 26. As shown, the cross member brackets 28 are attached to the back posts 22 near a forward edge 32 of the back posts 22. The width of the cross member 26/cross member brackets 28 can be adjusted to correspond to the width of the back frame 20 between the back posts 22 through the use of different mounting holes 30.

A pair of swing link brackets 34 are also connected to the cross member 26 using mounting holes 30. The swing link brackets 34 have a downwardly extending leg 36. Each downwardly extending leg 36 is pivotally coupled to a corresponding swing link 38, at pivot 40. Each swing link 38 is preferably formed with a bend 42 generally mid-way along the swing link 38. The bend 42 extends the lower portion both downwardly and rearwardly (away from forward edge 32 of the back posts 22). A lumbar bracket 44 is connected to the lower end of each swing link 38. As shown, in one aspect, the swing link 38 is rigidly connected to the lumbar bracket 44 through coupling points 46, using, for example, nuts and bolts.

The lumbar brackets 44 are used to connect the swing links 38 to a lumbar support 48. Lumbar support 48 spans the distance between the swing links 38. In one aspect, lumbar support 48 is rigidly connected to lumbar brackets 44, and is formed with mounting holes 50. As shown, lumbar support 48 has a flat, planar rear surface 52 that abuts the lumbar brackets 44. The lumbar support 48 also has a curved forward surface 54 extending away from the rear surface 52. The mounting holes 50 may be provided with countersinks 56 extending into the lumbar support 48 from the curved forward surface 54 to accommodate mounting bolts to couple the lumbar support 48 to the lumbar brackets 44. The lumbar support 48 can be formed from a number of different materials, such as wood, plastic, or metal. Additionally, the curved forward surface 54 may be finished with a padded layer. While the connection between the swing links 38 and the lumbar support 48 is shown as a rigid connection, the connection could also allow for some movement, such as pivotal movement to the swing links 38. Such a connection could be used to allow the lumbar support to "float" or rotate so as to self-align in a comfortable position for the occupant of chair 10. In such an embodiment, only one coupling point 46 would be used on each side. Lumbar support 48 extends between back posts 22, but lumbar support 48 does not have to extend the full width between back posts 22. Because the width of the chair back 14 can vary, a lumbar support 48 having a width of a relatively narrow chair back 14 would be advantageous, in that the design could be used across chairs having chair backs of greater width. In such a design, the lumbar support 48 is centered in the chair back 14 between the back posts 22, with the swing links 38 correspondingly mounted to the cross member 26.

Figure 5:
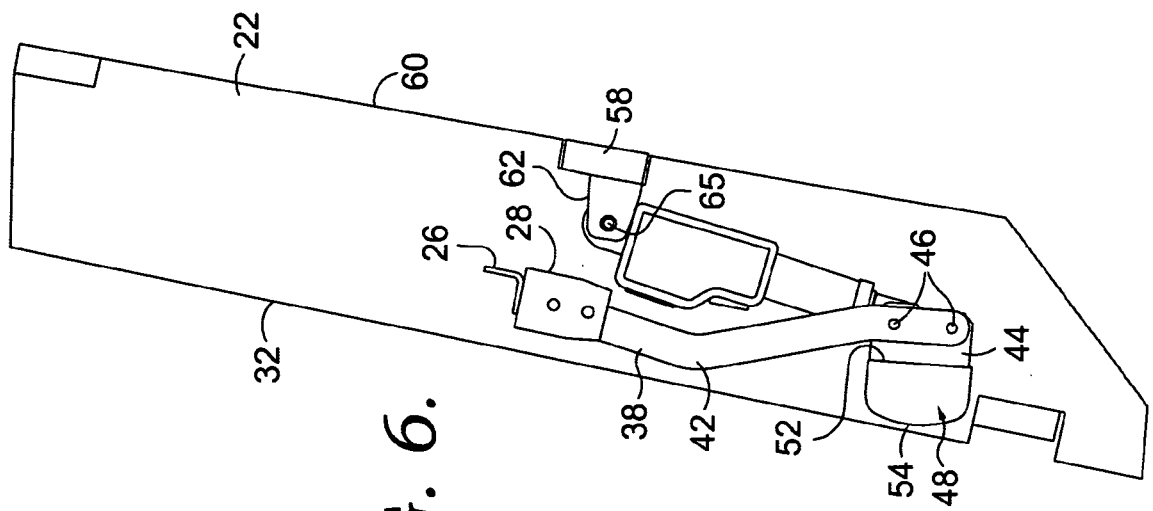
FIG. 5 is a side view of the adjustable lumbar support mechanism depicted in FIG. 3, in accordance with an embodiment of the present invention.
Figure 6:
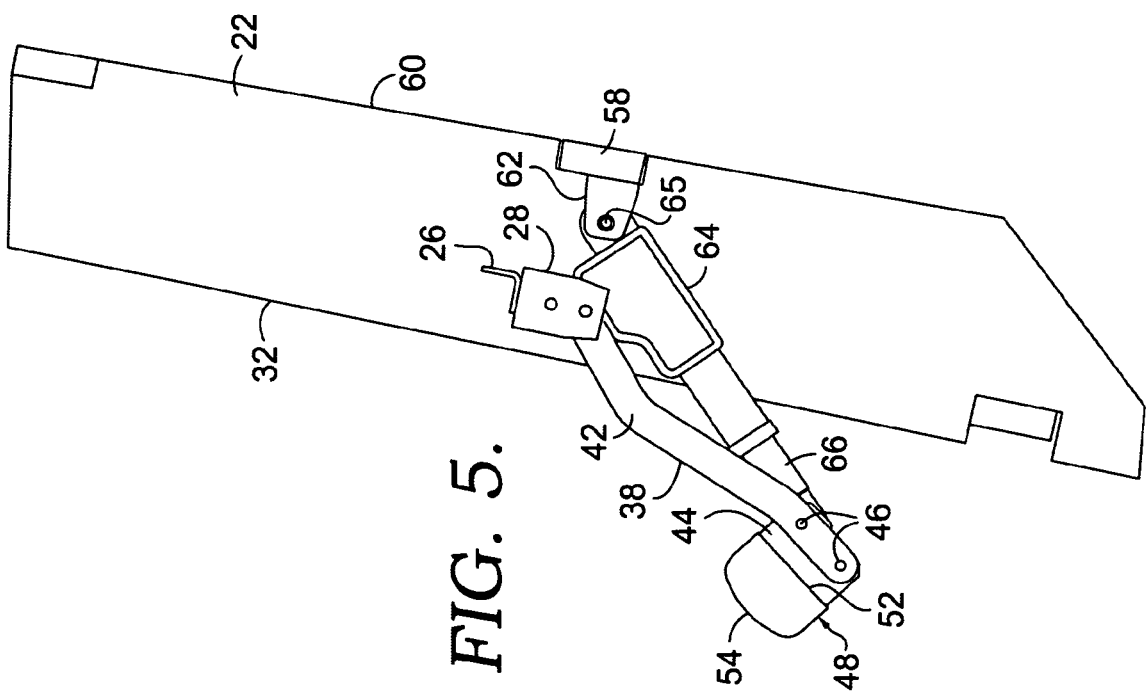
FIG. 6 is a side view of the mechanism depicted in FIG. 5, but shown in a retracted position, in accordance with an embodiment of the present invention.
Figure 7:
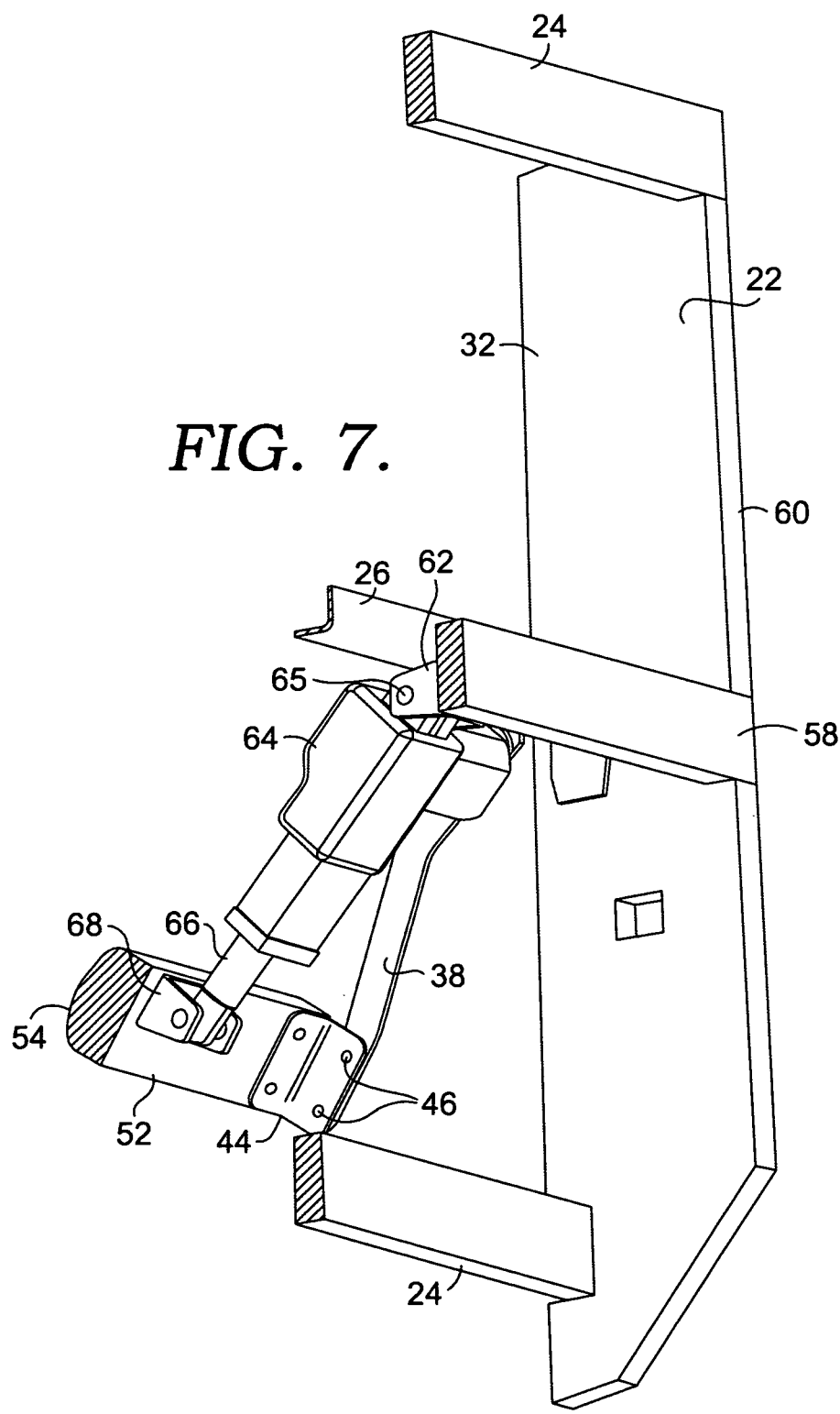
FIG. 7 is a partial, rear perspective view of the mechanism in a position similar to FIG. 3, in accordance with an embodiment of the present invention.

As best seen in FIGS. 5 and 6, a cross rail 58 is coupled to and between back posts 22 adjacent a rear edge 60 of the back posts 22. The cross rail 58 is, in one aspect, located below the cross 26. Cross rail 58 could be a wood rail component of the chair back 14, or a fabricated rail supplied to attach to the chair back 14, for example. A clevis 62 is mounted to cross rail 58 generally midway along the cross rail 58. Clevis 62 is used to pivotally couple an actuating mechanism 64 to cross rail 58 at a pivot point 65. As an example, actuating mechanism 64 could be an electric actuator or motor. In an exemplary aspect, the pivot point 65 is located rearwardly and below pivot 40. Actuating mechanism 64 extends downwardly from cross rail 58 towards lumbar support 48. Actuating mechanism 64 has an extending shaft 66. The shaft 66 is pivotally coupled to a clevis 68 that is, in turn, coupled to lumbar support 48. The front surface 54 of lumbar support 48 may be provided with a countersunk area 70 to accommodate mounting hardware (such as nuts and bolts) used to couple the clevis 68 to the lumbar support 48. The lumbar support 48 can be vertically positioned in chair back 14 by moving the cross member brackets 28 and cross rail 58 up or down within the chair back 14, according to the design desires of the manufacturer to achieve the best position of the lumbar support 48 for the respective chair 10.

The actuating mechanism 64 is coupled to an activator, such as a remote control, or switch (not shown) usable by the occupant of the chair 10. As the actuating mechanism 64 is engaged, the shaft 66 extends from the actuating mechanism 64. As the shaft 66 extends, the lumbar support 48 is movable from a retracted position, shown in FIGS. 1 and 6, to an extended position, such as that shown in FIGS. 2-5 and 7-8. The movement is controlled by the swing links 38. The lumbar support 48 can be moved to any position between the extended and retracted positions, based upon the desire of the chair occupant. While not shown, the material covering back 14 in the lumbar area 16 accommodates this movement. For example, the fabric could be elastic, or could be provided with a billowing to allow it to expand, and retract.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

It will be seen from the foregoing that this invention is one well adapted to attain the ends and objects set forth above, and to attain other advantages, which are obvious and inherent in the device. It will be appreciated by persons skilled in the art that the present invention is not limited to what has been particularly shown and described herein above. Rather, all matter herein set forth or shown in the accompanying drawings is to be interpreted as illustrative and not limiting.

What is claimed is:

1. An adjustable lumbar support mechanism for adjusting a position of a lumbar support in a seating unit having a seat back with a back frame, the back frame having a rear side and a front side, the adjustable lumbar support mechanism comprising:
    a pair of spaced apart swing links, each having an upper end and a lower end, the upper end of each swing link pivotally coupled to the back frame;
    a lumbar support having a first side and a second side, the first side being coupled to a lower end of one of the swing links, and the second side being coupled to a lower end of the other of the swing links; and
    an actuating mechanism having an extendable shaft coupled to the lumbar support between the first side and the second side, the actuating mechanism having an upper end, opposite the extendable shaft, pivotably coupled to the back frame,
    wherein extension of the extendable shaft of the actuating mechanism moves the lumbar support in a direction away from the rear side of the back frame.

2. The adjustable lumbar support mechanism of claim 1, wherein the lumbar support has a front surface extending between the first side and the second side, the front surface having a convex shape facing the front side of the back frame.

3. The adjustable lumbar support mechanism of claim 2, wherein the back frame includes a pair of spaced apart back posts, one of which is on each side of the back frame, the mechanism further comprising:
    a first cross member bracket mounted to one back post;

a second cross member bracket mounted to the other back post;

a cross member coupled to each of the first cross member bracket and the second cross member bracket, and extending therebetween; and a first swing link bracket fixedly coupled to the cross member, the first swing link bracket pivotally coupled to one of the swing links;

a second swing link bracket fixedly coupled to the cross member and spaced from the first swing link bracket, the second swing link bracket pivotally coupled to the other of the swing links.

4. The adjustable lumbar support mechanism of claim 1, further comprising a cross rail fixedly coupled to, and between, the back posts of the back frame, and wherein the upper end of the actuating mechanism is pivotally coupled to the cross rail.

5. The adjustable lumbar support mechanism of claim 4, wherein the pivotal coupling of the actuating mechanism to the cross rail is behind the pivotal coupling of the swing links to the respective swing link brackets.

6. The adjustable lumbar support mechanism of claim 5, wherein at least one of the cross member brackets or the cross member has a plurality of spaced mounting holes adapted to adjust the width of the combined cross member and cross member brackets.

7. The adjustable lumbar support mechanism of claim 6, wherein the front surface of the lumbar support includes an exterior padding.

8. The adjustable lumbar support mechanism of claim 7, wherein the pivotal coupling of the actuating mechanism to the lumbar support is midway between the first side of the lumbar support and the second side of the lumbar support.

9. A residential furniture seating unit, comprising:

a seat spaced above a surface on which the seating unit rests;

a back extending upwardly from the seat adjacent a rear of the seat, the back including a back frame having a rear side and a front side; and an adjustable lumbar support mechanism for adjusting a position of a lumbar support in the residential furniture seating unit, the adjustable lumbar support mechanism comprising:

a pair of spaced apart swing links, each having an upper end and a lower end, the upper end of each swing link pivotally coupled to the back frame;

a lumbar support having a first side and a second side, the first side being coupled to a lower end of one of the swing links, and the second side being coupled to a lower end of the other of the swing links; and an actuating mechanism having an extendable shaft coupled to the lumbar support between the first side and the second side, the actuating mechanism having an upper end, opposite the extendable shaft, pivotably coupled to the back frame, wherein extension of the extendable shaft of the actuating mechanism moves the lumbar support in a direction away from the rear side of the back frame.

10. The residential furniture seating unit of claim 9, wherein the lumbar support has a front surface extending between the first side and the second side, the front surface having a convex shape facing the front side of the back frame.

11. The residential furniture seating unit of claim 10, wherein the back frame includes a pair of spaced apart back posts, one of which is on each side of the back frame, the mechanism further comprising:

a first cross member bracket mounted to one back post;

a second cross member bracket mounted to the other back post;

a cross coupled to each of the first cross member bracket and the second cross member bracket, and extending therebetween;

a first swing link bracket fixedly coupled to the cross member, the first swing link bracket pivotally coupled to one of the swing links; and a second swing link bracket fixedly coupled to the cross member and spaced from the first swing link bracket, the second swing link bracket pivotally coupled to the other of the swing links.

12. The residential furniture seating unit of claim 11, further comprising a cross rail fixedly coupled to, and between, the back posts of the back frame, and wherein the upper end of the actuating mechanism is pivotally coupled to the cross rail.

13. The residential furniture seating unit of claim 12, wherein the pivotal coupling of the actuating mechanism to the cross rail is behind the pivotal coupling of the swing links to the respective swing link brackets.

14. The residential furniture seating unit of claim 13, wherein at least one of the cross member brackets or the cross member has a plurality of spaced mounting holes adapted to adjust the width of the combined cross member and cross member brackets.

15. The residential furniture seating unit of claim 14, wherein the front surface of the lumbar support includes an exterior padding.

16. The residential furniture seating unit of claim 15, wherein the pivotal coupling of the actuating mechanism to the lumbar support is midway between the first side of the lumbar support and the second side of the lumbar support.

* * * * *